June 12, 1923.
C. W. METZGAR
PLATE VALVE LIFTER
Filed May 20, 1922
1,458,625
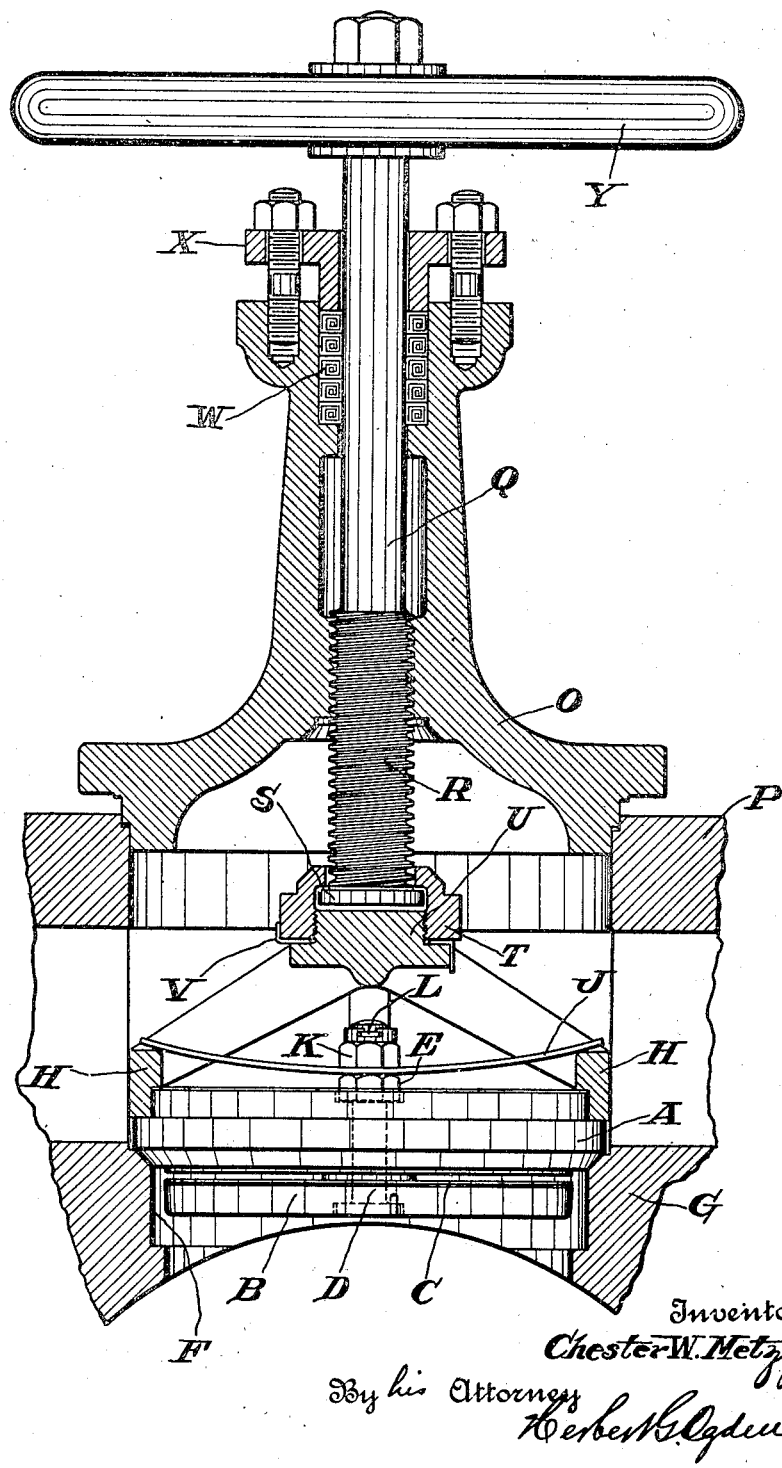
Inventor
Chester W. Metzgar
By his Attorney
Herbert G. Ogden Patented June 12, 1923.

1,458,625

UNITED STATES PATENT OFFICE.

CHESTER W. METZGAR, OF EASTON, PENNSYLVANIA, ASSIGNOR TO INGERSOLL-RAND COMPANY, OF JERSEY CITY, NEW JERSEY, A CORPORATION OF NEW JERSEY.

PLATE-VALVE LIFTER.

Application filed May 20, 1922. Serial No. 562,373.

*To all whom it may concern:*

Be it known that I, CHESTER W. METZGAR, a citizen of the United States, and a resident of Easton, county of Northampton, and State of Pennsylvania, have invented a certain Plate-Valve Lifter, of which the following is a specification accompanied by drawings.

This invention relates to plate valves, but more particularly to a plate valve lifter for compressor valves, by means of which a plate valve and its associated parts may be lifted from its seat when desired and readily replaced.

The objects of the invention are to secure a simple and efficient device which will not readily get out of order for lifting the plate valve structure from its seat when required, and to construct the device in such manner that it may be applied to any existing type of well known plate valves.

To these ends the invention is shown in one of its preferred forms in the accompanying drawing, which is a side elevation partly in longitudinal section of a plate valve lifter embodying the invention.

Referring to the drawings, the plate valve shown for purposes of illustration includes a valve seat A, a stop plate B, a valve plate C and a stud D and nut E for holding the parts together. The plate valve need not be further described since the invention may be applied to any suitable valve. The plate valve structure, including the parts indicated, is adapted to lie in a valve opening F in the cylinder wall G of a compressor. A valve stem yoke H is arranged over the valve seat A and a valve holder, preferably in the form of a flat leaf spring J engages both the stud D and the valve stem yoke H for holding the valve structure to the yoke. In this instance, the spring J is held on the stud D by means of the castle nut K and cotter pin L, while the ends of the spring bear upon the yoke H.

A bonnet O is adapted to be secured (by means not shown) to the compressor outer casing P opposite the valve opening F and a valve stem Q is movable in said bonnet. In this instance the stem Q is provided with a threaded portion R threaded into a portion of the bonnet. The end of the stem Q is formed with an enlargement S engaged by a lock nut T threaded to the end U of the yoke H, and a lock plate V locks the nut T in position. The outer end of the stem Q passes through the packing W and gland X and is provided with a hand wheel Y for rotating the stem.

As the stem Q is rotated by the hand wheel Y, the plate valve structure will be lifted from its seat or replaced thereon, as the case may be.

I claim:

1. A plate valve lifter, comprising a plate valve including its seat, stop plate and stud adapted to lie in a valve opening in the cylinder wall of a compressor, a valve stem yoke over the valve seat, a valve holder for holding the plate valve and its associated parts to the yoke, a bonnet adapted to be secured to the compressor outer casing opposite the said valve opening, a valve stem carried by said bonnet and connected to the valve stem yoke, and means for actuating said stem to lift the plate valve and its associated parts.

2. A plate valve lifter, comprising a plate valve including its seat, stop plate and stud adapted to lie in a valve opening in the cylinder wall of a compressor, a valve stem yoke over the valve seat, a valve holder engaging the valve stud and the said yoke, a bonnet adapted to be secured to the compressor outer casing opposite the said valve opening, a valve stem movable in said bonnet and engaging the said yoke, and means for actuating the said stem to lift the plate valve and its associated parts.

3. A plate valve lifter, comprising a plate valve including its seat, stop plate and stud adapted to lie in a valve opening in the cylinder wall of a compressor, a valve stem yoke over the valve seat, a valve holder in the form of a flat spring engaging the valve stud and the said yoke, a bonnet adapted to be secured to the compressor outer casing opposite the said valve opening, a valve stem movable in said bonnet and engaging the said yoke, and means for actuating the said stem to lift the plate valve and its associated parts.

In testimony whereof I have signed this specification.

CHESTER W. METZGAR.